(12) United States Patent
Lee

(10) Patent No.: US 10,567,859 B2
(45) Date of Patent: Feb. 18, 2020

(54) RUGBY-BALL SPORTS SPEAKER

(71) Applicant: ATake Digital Technology (Shenzhen) Co., Ltd., Shenzhen, Guangdong (CN)

(72) Inventor: Kuo Tsai Lee, Shenzhen (CN)

(73) Assignee: ATAKE DIGITAL TECHNOLOGY (SHENZHEN) CO., LTD., Shenzhen (CN)

( * ) Notice: Subject to any disclaimer, the term of this patent is extended or adjusted under 35 U.S.C. 154(b) by 112 days.

(21) Appl. No.: 15/852,690

(22) Filed: Dec. 22, 2017

(65) Prior Publication Data
US 2019/0158942 A1  May 23, 2019

(30) Foreign Application Priority Data

Nov. 22, 2017 (CN) .......................... 2017 1 1178409

(51) Int. Cl.
| | |
|---|---|
| H04R 1/02 | (2006.01) |
| H04S 1/00 | (2006.01) |
| H04R 3/00 | (2006.01) |
| A63B 43/00 | (2006.01) |
| H02J 7/00 | (2006.01) |
| H04R 5/02 | (2006.01) |

(52) U.S. Cl.
CPC .......... *H04R 1/025* (2013.01); *A63B 43/002* (2013.01); *H04R 1/028* (2013.01); *H04R 3/00* (2013.01); *H04S 1/007* (2013.01); *A63B 2225/50* (2013.01); *H02J 7/0042* (2013.01); *H04R 5/02* (2013.01); *H04R 2420/07* (2013.01); *H04R 2420/09* (2013.01)

(58) Field of Classification Search
CPC .......... H04R 1/025; H04R 1/02; H04R 1/028; H04R 2201/029; A63B 2243/007
USPC .............................................. 381/87, 332–336
See application file for complete search history.

(56) References Cited

U.S. PATENT DOCUMENTS

| | | | |
|---|---|---|---|
| 2016/0105756 A1* | 4/2016 | Yuen .................... | H04R 1/1041 381/309 |
| 2017/0189768 A1* | 7/2017 | Dingle ................. | A63B 43/004 |

* cited by examiner

*Primary Examiner* — George C Monikang
(74) *Attorney, Agent, or Firm* — Hauptman Ham, LLP

(57) ABSTRACT

Disclosed is a rugby-ball sports speaker that includes a flexible protective sleeve defined with an opening and an accommodating cavity communicating with the opening. The speaker further includes at least one receiving casing defined with a receiving slot, the receiving casing being accommodated inside the accommodating cavity and resisting an inner wall of the flexible protective sleeve. The speak further includes at least one speaker assembly received inside the receiving slot and resisting an inner wall of the receiving casing. The speaker further includes a net cover covering the opening and fixedly connected to the flexible protective sleeve, the net cover sealing the receiving casing within the accommodating cavity. The technical solution of this disclosure is designed to enable the user to simultaneously enjoy the fun of throwing and kicking as well as listening to music relying solely on the rugby ball, thus augmenting the user experience.

17 Claims, 4 Drawing Sheets

RUGBY-BALL SPORTS SPEAKER

RELATED APPLICATIONS

The present application claims the priority of China Application No. 201711178409.2, filed Nov. 22, 2017, which are incorporated herein by reference in their entireties.

TECHNICAL FIELD

This disclosure relates generally to the technical field of rugby, and more particularly relates to a rugby-ball sports speaker.

BACKGROUND

Existing rugby ball (American football) sports products are made by simply sewing leather or plastic leather to cover an inflatable rubber bladder or by adhering leather or plastic leather onto an inflatable rubber bladder. There are also speaker products that are shaped as a rugby ball (American football), but such products don't possess the rugby ball (American football)'s function of withstanding throwing and kicking. So when users are playing sports using a rugby ball, they cannot simultaneously enjoy the fun of throwing and kicking as well as listening to music relying solely on the rugby ball, resulting in poor user experience.

SUMMARY

It is therefore the main objective of this disclosure to provide a rugby-ball sports speaker designed to enable users to simultaneously enjoy the fun of throwing and kicking as well as listening to music through solely the rugby ball thus augmenting the user experience.

In order to achieve the above-described objective, a rugby-ball sports speaker is provided that includes: a flexible protective sleeve defined with an opening and an accommodating cavity communicating with the opening; at least one receiving casing defined with a receiving slot, the receiving casing being accommodated in the accommodating cavity and resisting an inner wall of the flexible protective sleeve; at least one speaker assembly received in the receiving slot and resisting an inner wall of the receiving casing; and a net cover covering the opening and fixedly connected with the flexible protective sleeve, the net cover sealing the receiving casing in the accommodating cavity.

Optionally, the thickness h measured from an outer surface of the flexible protective sleeve to an inner wall of the accommodating cavity may gradually decrease from the middle to both ends.

Optionally, the flexible protective sleeve may further include a supporting plate that is sleeved in the accommodating cavity and partitions the accommodating cavity into a left chamber located on the left side of the supporting plate and a right chamber located on the right side of the supporting plate, with one receiving casing accommodated in the left chamber and another accommodated in the right chamber. The supporting plate may further be defined with a first wiring hole that communicates the left chamber with the right chamber.

Optionally, the supporting plate and the flexible protective sleeve may be integrally formed.

Optionally, a first fixing bracket may further be arranged in the receiving slot, and the rugby-ball sports speaker may further include a PCB circuit board fixed on the first fixing bracket. The receiving casing may further define a second wiring hole that communicates the accommodating cavity with the receiving slot.

Optionally, an engaging portion may further be arranged in the receiving slot. The speaker assembly may include a battery and a loudspeaker assembly electrically connected to the battery. The battery may be partially engaged with the engaging portion, and the loudspeaker assembly may be fixedly connected with the receiving casing thus sealing the battery inside the receiving slot.

Optionally, the loudspeaker assembly may include a second fixing bracket, a loudspeaker, and a fixing cover. The second fixing bracket may be accommodated in the receiving slot and fixedly connected with the receiving casing. The loudspeaker may be fixedly connected with the second fixing bracket, and the fixing cover may cover the second fixing bracket thus sealing the loudspeaker within the second fixing bracket.

Optionally, the rugby-ball sports speaker may include an LED light bar fixed to the second fixing bracket and electrically connected to the PCB circuit board.

Optionally, the rugby-ball sports speaker may further include a charging assembly. The charging assembly may include a third fixing bracket, a charging post, and a charging port. The third fixing bracket may be fixedly connected with the net cover. The charging post may be fixed to the third fixing bracket and electrically connected to the battery. The charging port may be coupled to the charging post.

Optionally, the rugby-ball sports speaker may further include a button switch and a fourth fixing bracket configured for fixing the button switch. The button switch may be electrically connected to the PCB circuit board. The net cover may cover the button switch thus sealing the button switch within the accommodating cavity.

According to the technical solution of this disclosure, the receiving casing for receiving the speaker assembly is arranged in the flexible protective sleeve, and the net cover is arranged on the opening of the flexible protective sleeve to seal the receiving casing within the flexible protective sleeve. Thus, when playing sports with the rugby-ball sports speaker, the speaker assembly can be used for music playback. Also, due to the provision of the flexible protective sleeve, the energy transmitted inwardly by the external force in throwing or kicking the rugby-ball sports speaker would be weakened by the elastic change of the flexible protective sleeve; since the receiving casing presses against the inner wall of the flexible protective sleeve, the receiving casing would be able to further diminish the energy transmitted inward from the external force. In addition, by arranging the net cover, the speaker assembly and the receiving casing can be conveniently fixed in the flexible protective sleeve so that the speaker assembly will not vibrate and so can operate normally in throwing or kicking of the rugby-ball sports speaker. Therefore, the technical solution of this disclosure can enable the user to simultaneously enjoy the fun of throwing and kicking as well as listening to music through solely the rugby ball, augmenting the user experience.

BRIEF DESCRIPTION OF THE ACCOMPANYING DRAWINGS

To better illustrate the technical solutions according to embodiments of this disclosure or in the prior art, the accompanying drawings required in the description of the embodiments herein or the prior art will now be briefly described. Apparently, the accompanying drawings in the following description illustrate merely some embodiments of this disclosure, and those of ordinary skill in the art will be able to obtain other drawings based on the arrangements shown in these drawings without making creative efforts, where in these drawings.

EXPLANATION OF REFERENCE NUMERALS

Figure 1:
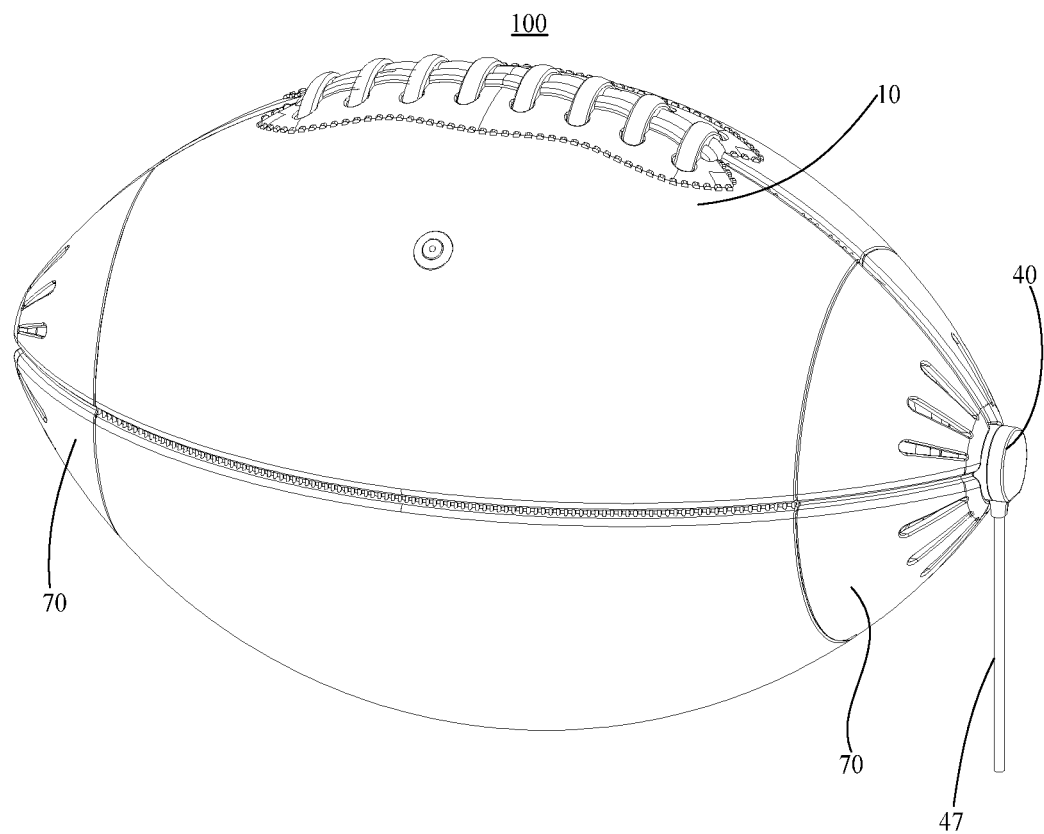
FIG. 1 is a schematic diagram of a rugby-ball sports speaker according to an embodiment of this disclosure.

| Reference Numerals | Names |
| --- | --- |
| 100 | Rugby-Ball Sports Speaker |
| 10 | Flexible Protective Sleeve |
| 11 | Opening |
| 13 | Accommodating Cavity |
| 15 | Supporting Plate |
| 151 | First Wiring Hole |
| 20 | Fourth Fixing Bracket |
| 30 | Receiving Casing |
| 31 | Receiving Slot |
| 311 | First Fixing Bracket |
| 313 | Engaging Portion |
| 33 | Second Wiring Hole |
| 40 | Charging Assembly |
| 41 | Third Fixing Bracket |
| 43 | Charging Post |
| 47 | Charging Cable |
| 50 | Speaker Assembly |
| 51 | Battery |
| 53 | Loudspeaker Assembly |
| 531 | Second Fixing Bracket |
| 533 | Loudspeaker |
| 535 | Fixing Cover |
| 60 | Button Switch |
| 70 | Net Cover |
| 80 | LED Light Bar |
| 90 | PCB Circuit Board |

Implementations, functional features, and advantages of this disclosure will now be described in further detail in connection with embodiments and the accompanying drawings.

DETAILED DESCRIPTION OF ILLUSTRATED EMBODIMENTS

Technical solutions embodied in the embodiments of this disclosure will now be clearly and comprehensively described in connection with the accompanying drawings intended for these embodiments. Apparently, the described embodiments are merely some but not all embodiments of this disclosure. All other embodiments obtained by persons of ordinary skill in the art based on the embodiments of this disclosure without making creative efforts shall all fall within the scope of protection of this disclosure.

It should be noted that, all directional indicators (such as "upper," "lower," "left," "right," "front," "rear," . . . ) that appear in the embodiments of the disclosure are merely used to illustrate the relative positions and movement or the like among various components under a specific posture (as shown in the drawings), and should the specific posture change, these directional indicators will also change accordingly.

As used herein, terms such as "first," or "second," are intended for illustrative purposes only and are not to be construed as indicating or implying their relative importance or implicitly indicating the number of the specified technical features. Thus, features defined by terms such as "first," or "second" may explicitly or implicitly include at least one of such features. Additionally, technical solutions of various embodiments may be combined with one another, but such combinations must be based on the achievability with respect to those of ordinary skill in the art. Where a combination of technical solutions is found contradictory or unachievable, such a combination shall not be regarded as existent nor would it fall within the scope of protection of this disclosure.

This disclosure provided a rugby-ball sports speaker 100.

As illustrated in FIGS. 1 to 7, the rugby-ball sports speaker according to the technical solution of this disclosure may include: a flexible protective sleeve 10 defined with an opening 11 and an accommodating cavity 13 communicating with the opening 11; at least one receiving casing 30 that is defined with a receiving slot 31 and accommodated within the accommodating cavity 13 and that resists an inner wall of the flexible protective sleeve 10; at least one speaker assembly 50 that is received in the receiving slot 31 and resists an inner wall of the receiving casing 30; and a net cover 70 that covers the opening 11 and is fixedly connected with the flexible protective sleeve 10 thus sealing the receiving casing 30 within the accommodating cavity 13.

According to the technical solution of this disclosure, the receiving casing 30 for receiving the speaker assembly 50 is arranged in the flexible protective sleeve 10, and the net cover 70 is arranged on the opening 11 of the flexible protective sleeve 10 to seal the receiving casing 30 within the flexible protective sleeve 10. Thus, when playing sports with the rugby-ball sports speaker 100, the speaker assembly 50 can be used for music playback. Also, due to the provision of the flexible protective sleeve 10, the energy transmitted inwardly by the external force in throwing or kicking the rugby-ball sports speaker 100 would be weakened by the elastic change of the flexible protective sleeve 10; since the receiving casing 30 resists the inner wall of the flexible protective sleeve 10, the receiving casing 30 would be able to further diminish the energy transmitted inward from the external force. In addition, by arranging the net cover 70, the speaker assembly 50 and the receiving casing 30 can be conveniently fixed in the flexible protective sleeve 10 so that the speaker assembly 50 will not vibrate and so can operate normally in throwing or kicking of the rugby-ball sports speaker 100. Therefore, the technical solution of this disclosure can enable the user to simultaneously enjoy the fun of throwing and kicking as well as listening to music through solely the rugby ball, augmenting the user experience.

In this embodiment, the flexible protective sleeve 10 may be made of a composite material by coating PP (polypropylene) plastic with PU (polyurethane) foam plastic, making the flexible protective sleeve 10 have better anti-impact and anti-wear performance. Of course other materials with good elastic deformation performance can also be used. In addition, the flexible protective sleeve 10 together with the receiving casing 30 may be injection-molded via the aid of a mold, and the two are inseparable after the injection molding. Such a configuration can enable the flexible protective sleeve 10 and the receiving casing 30 to completely fit with each other, so that the vibration of speaker assembly 50 can be best attenuated and buffered. It can be understood that in order to reduce the vibration of the speaker assembly 50 when the rugby ball speaker is hit, the accommodating cavity 13 and the receiving casing 30 can be so matched with each other that the outer surface of the receiving casing 30 and the inner wall of the accommodating cavity 13 are completely pressed against and stick with each other, such that the receiving casing 30 can be uniformly stressed and better absorb external vibration. The net cover 70 may be provided with a sound hole (not shown). The sound hole may be disposed adjacent to the speaker assembly 50 to facilitate transmission of music played by the speaker assembly 50 thereby augmenting the user experience.

Figure 4:
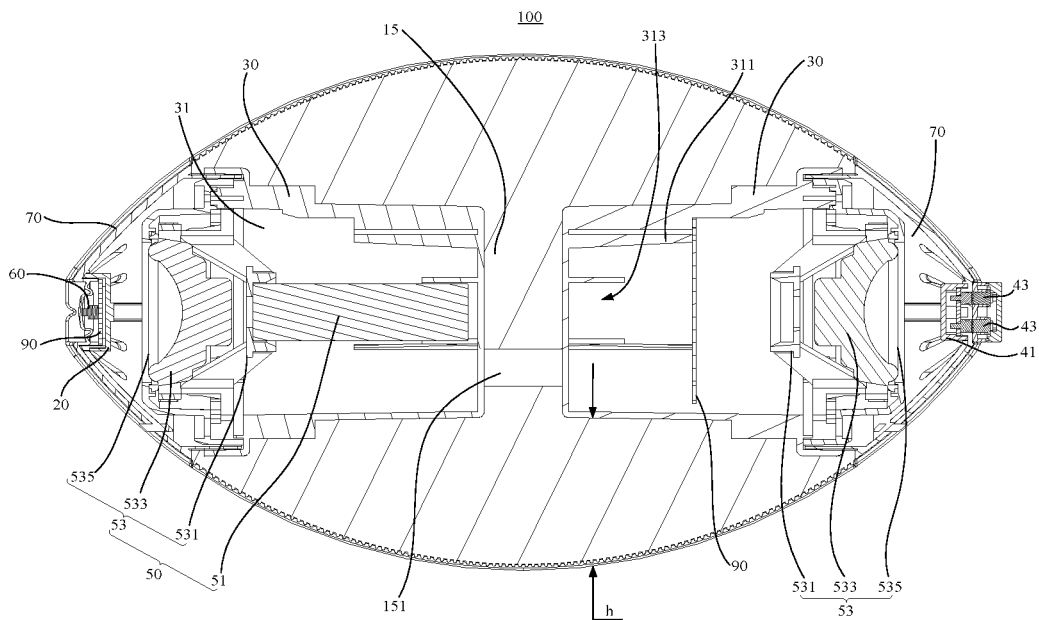
FIG. 4 is a cross-sectional view of the rugby-ball sports speaker of FIG. 3 along the A-A direction.
Figure 5:
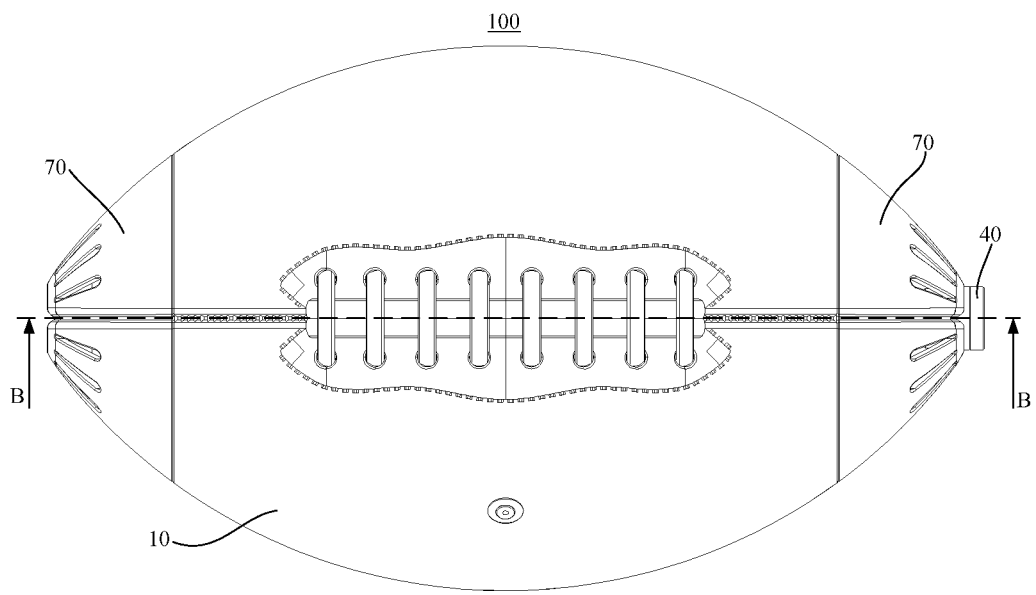
FIG. 5 is a plan view of a rugby-ball sports speaker according to an embodiment of this disclosure.
Figure 6:
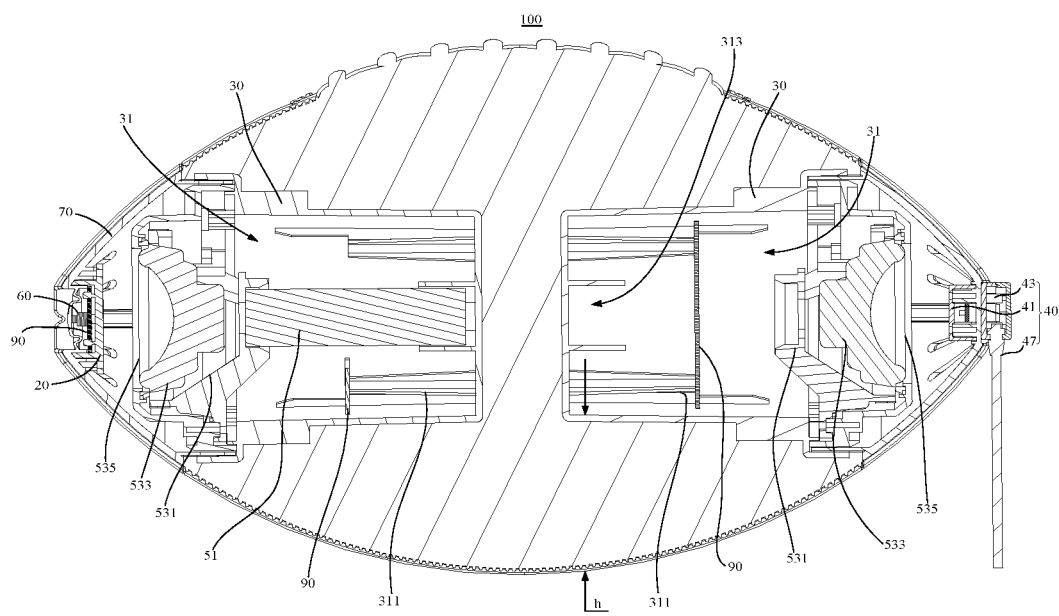
FIG. 6 is a cross-sectional view of the rugby-ball sports speaker of FIG. 5 along the B-B direction.

Further as illustrated in FIGS. 4 and 6, the thickness h measured from the outer surface of the flexible protective sleeve 10 to the inner wall of the accommodating cavity 13 may gradually decrease from the middle to both ends. In this embodiment, the flexible protective sleeve 10 may have an approximately ellipsoidal body with ends flattened and the thickness h of the flexible protective sleeve 10 decreasing from its middle to both ends; that is, the shape of the rugby-ball sports speaker 100 is similar to that of a rugby ball. Thus, when the central portion of the rugby-ball sports speaker 100 is impacted, the vibration can be well damped due to the relatively greater thickness of the central portion of the flexible protective sleeve 10 and so the speaker assembly 50 would experience less vibration. Otherwise when the ends of the rugby sports speaker 100 are impacted, due to the irregular shape of the rugby-ball sports speaker 100, the impact force cannot completely act on the rugby-ball sports speaker 100, so that the speaker assembly 50 would experience less vibration and the rugby-ball speaker can operate normally facilitating the use by the user.

In this embodiment, the flexible protective sleeve 10 may further include a supporting plate 15 sleeved in the accommodating cavity 13. The supporting plate 15 may partition the accommodating cavity 13 into a left chamber (not shown) located on the left side of the supporting plate 15 and a right chamber (not shown) located on the right side of the supporting plate 15. One receiving casing 30 may be received in the left chamber while another receiving casing 30 may be received in the right chamber. The supporting plate 15 may further be defined with a first wiring hole that communicates the left chamber with the right chamber. By providing the supporting plate 15, the vibration of the flexible protective sleeve 10 upon impact can be reduced so that the speaker assembly 50 can operate normally. Furthermore, by defining the first wiring hole 151 in the supporting plate 15, the overall circuit structure of the rugby-ball sports speaker 100 can be made more compact, thereby further enhancing the reliability of the rugby-ball sports speaker 100. It can be understood that the height of the support plate 15 in the axial direction of the flexible protective sleeve 10 can be changed according to actual needs so as to facilitate vibration damping.

Figure 7:
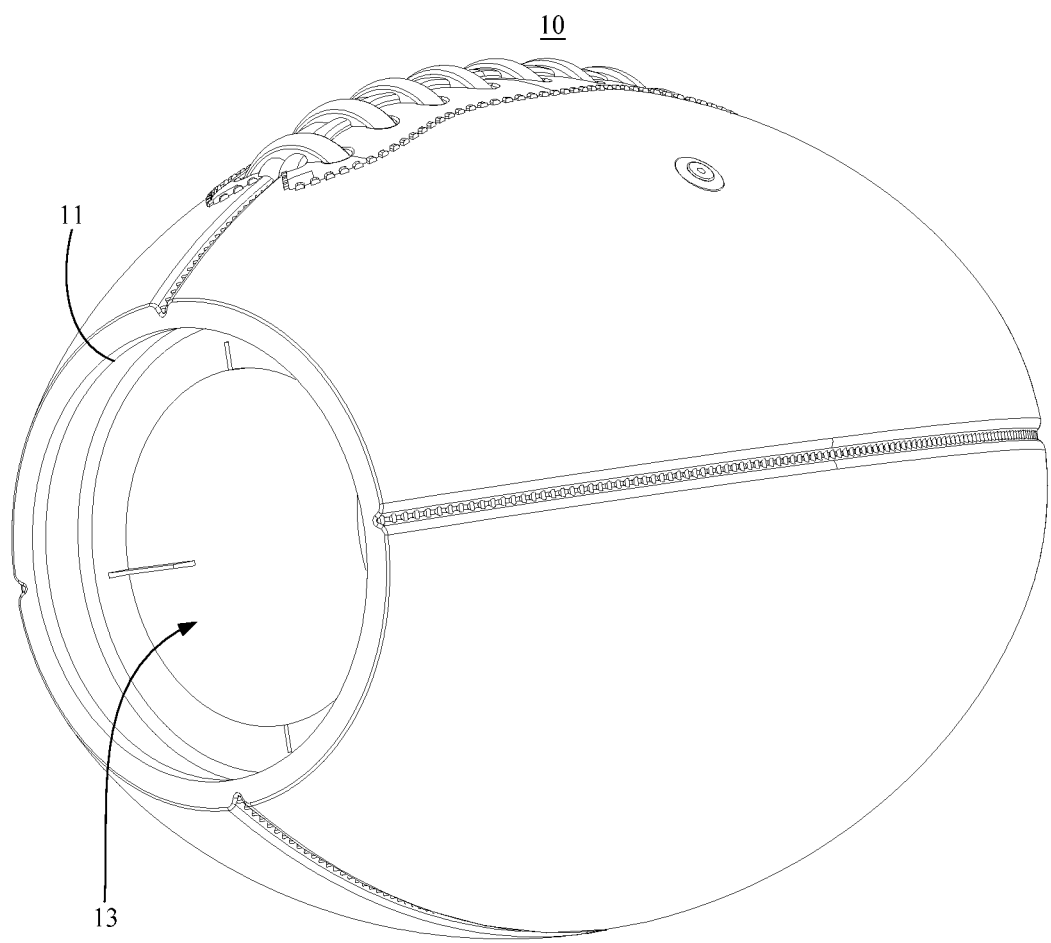
FIG. 7 is a schematic diagram of a flexible protective sleeve of a rugby-ball sports speaker according to an embodiment of this disclosure.

Referring further to FIG. 1 and FIG. 7, the supporting plate 15 and the flexible protective sleeve 10 may be integrally formed. When the rugby-ball sports speaker 100 is impacted, the one-piece structure as configured can best enable the supporting plate 15 to transmit the vibration so as to reduce the vibration, and the integral molded structure can also facilitate processing and molding.

Figure 2:
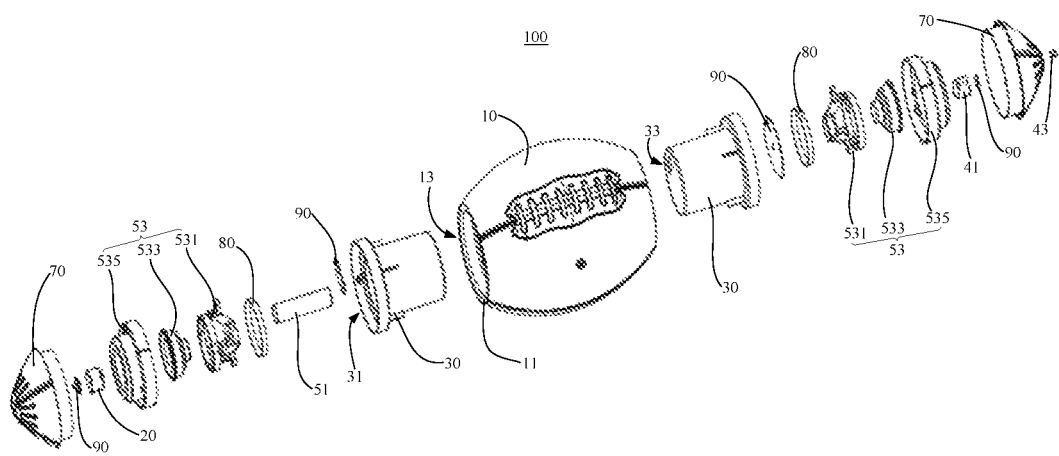
FIG. 2 is an exploded diagram of a rugby-ball sports speaker according to an embodiment of this disclosure.
Figure 3:
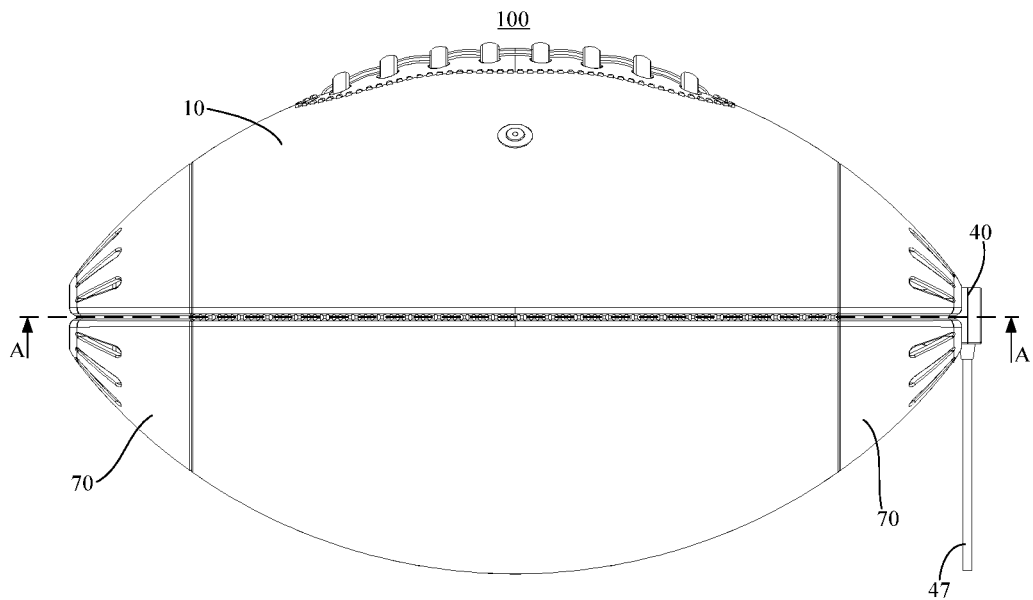
FIG. 3 is a front view of a rugby-ball sports speaker according to this disclosure.

Referring further to FIGS. 2, 4, and 6, a first fixing bracket 311 may further be arranged in the receiving slot 31, and the rugby-ball sports speaker 100 may further include a PCB circuit board 90 fixed on the first fixing bracket 311. The receiving casing 30 may further be defined with a second wiring hole 33 which communicates the accommodating cavity 13 with the receiving slot 31. By fixing the PCB circuit board 90 on the first fixing bracket 311, the PCB circuit board 90 will not vibrate when the rugby-ball sports speaker 100 is impacted and so the internal circuitry of the rugby-ball sports speaker 100 would be able to maintain normal operation. In addition, providing the second wiring hole 33 can further compact the overall internal structure of the rugby-ball sports speaker 100, and further enhance the reliability of the rugby-ball sports speaker 100. It can be understood that the second wiring hole 33 may be disposed on the surface of the receiving casing 30 adjacent to the supporting plate 15 and may be disposed directly opposite to the first wiring hole 151, so as to facilitate the circuitry installation.

Referring further to FIGS. 4 and 6, an engaging portion 313 may further be arranged in the receiving slot 31. The speaker assembly 50 may include a battery 51 and a loudspeaker assembly 53 electrically connected to the battery 51. The battery 51 may be partially engaged with the engaging portion 313, and the loudspeaker assembly 53 may be fixedly connected with the receiving casing 30 sealing the battery 51 inside the receiving slot 31. The engaging portion 313 is arranged to allow the battery 51 to be well fixed inside the receiving casing 30, preventing the battery 51 from vibrating when the rugby-ball sports speaker 100 is impacted. The battery 51 may be a battery 51 capable of storing electric energy such as a lithium battery 51.

Referring now further to FIGS. 2, 4, and 6, the loudspeaker assembly 53 may include a second fixing bracket 531, a loudspeaker 533, and a fixing cover 535. The second fixing bracket 531 may be accommodated within the receiving slot 31 and fixedly connected to the receiving casing 30. The loudspeaker 533 may be fixedly connected to the second fixing bracket 531. The fixing cover 535 may cover the second fixing bracket 531 and seal the loudspeaker 533 in the second fixing bracket 531. The second fixing bracket 531 is configured for fixing the loudspeaker 533 to enable a normal connection between the loudspeaker 533 and the battery 51 so that the loudspeaker 533 will still be able to keep operating when suffering vibration. Also by fixedly connecting the fixing cover 535 with the second fixing bracket 531, the loudspeaker 533 will not be directly affected by the vibration caused by the impact, thus improving the reliability of the apparatus and facilitating the use by the user. In this embodiment, the loudspeaker 533 may be a Bluetooth wireless dual-channel stereo loudspeaker 533 or a single-unit single-channel loudspeaker 533, as long as the loudspeaker can well deliver music for the user. Specifically, the fixing cover 535 may be fixedly connected with the receiving casing 30. One end of the net cover 70 may be inserted and fixed between the fixing cover 535 and the receiving casing 30. In this embodiment, the connecting portion of the fixing cover 535, the receiving casing 30, and the net cover 70 may be formed as an annular shape, and it will be appreciated that the diameter of the net cover 70 at the connecting portion may lie in a range between the diameter of the receiving casing 30 and that of the fixing cover 535.

Further as illustrated in FIG. 2, the rugby-ball sports speaker 100 may further include an LED light bar 80. The LED light bar 80 may be fixed on the second fixing bracket 531 and electrically connected to the PCB circuit board 90. In this embodiment, the LED light bar 80 may flash and shine in accordance with the rhythm of the audio emitted by the loudspeaker 533, thereby improving the user experience. It will be appreciated that in order to facilitate the illumination effect, the net cover 70 may be made of a transparent material or a translucent material.

Further as illustrated in FIGS. 4 and 6, the rugby-ball sports speaker 100 may further include a charging assembly 40. The charging assembly 40 may include a third fixing bracket 41, a charging post 43, and a charging port (not shown). The third fixing bracket 41 may be fixedly connected with the net cover 70. The charging post 43 may be fixed on the third fixing bracket 41 and electrically connected to the battery 51. The charging port may be coupled to the charging post 43. In this embodiment, the charging post 43 may be coated onto the third fixing bracket 41 using an in-mold injection molding process. One end of the charging post 43 may be electrically connected to the battery 51 while the other end may be coupled to the charging port; in particular, the charging port may be USB port and the charging post 43 may be a conductive metal post. In addition, a charging cable 47 soldered with positive and negative magnet connectors may be further provided. The charging cable 47 can be used to connect the rugby-ball sports speaker 100 to a power supply for the purpose of charging the rugby-ball sports speaker 100.

Furthermore, the rugby-ball sports speaker 100 may also include a button switch 60 and a fourth fixing bracket 20. The button switch 60 may be electrically connected to the PCB circuit board 90, and the net cover 70 may cover the button switch 60 sealing the button switch 60 in the accommodating cavity 13. The button switch 60 may be configured for controlling the power supply of the rugby-ball sports speaker 100. In this embodiment, the control switch and the fixing cover 535 can be integrally formed so as to achieve a seamless connection at the button switch 60 which is also waterproof and dustproof, thereby improving the reliability of the rugby-ball sports speaker 100 and facilitating the use by the user.

The foregoing merely portrays some exemplary embodiments of this disclosure and therefore is not intended to limit the patentable scope of the disclosure. Under the inventive concept of this disclosure, any equivalent structural changes based on the specification and accompanying drawings of the disclosure and any direct or indirect applications of the disclosure on other related technical fields shall all be compassed within the patentable scope of protection of this disclosure.

What is claimed is:

1. A rugby-ball sports speaker, comprising:
    a flexible protective sleeve, defined with an opening and an accommodating cavity communicating with the opening;
    at least one receiving casing, defined with a receiving slot, the receiving casing being accommodated in the accommodating cavity and resisting an inner wall of the flexible protective sleeve completely, a thickness h measured from an outer surface of the flexible protective sleeve to an inner wall of the accommodating cavity decreasing from the middle to both ends;
    at least one speaker assembly, received in the receiving slot and resisting an inner wall of the receiving casing; and
    a net cover, covering the opening and fixedly connected with the flexible protective sleeve thus sealing the receiving casing within the accommodating cavity.

2. The rugby-ball sports speaker of claim 1, wherein the flexible protective sleeve further comprises a supporting plate which is sleeved in the accommodating cavity and partitions the accommodating cavity into a left chamber located on the left side of the supporting plate and a right chamber located on the right side of the supporting plate, with one receiving casing accommodated in the left chamber and another receiving casing accommodated in the right chamber, and wherein the supporting plate is further defined with a first wiring hole which communicates the left chamber with the right chamber.

3. The rugby-ball sports speaker of claim 2, wherein the supporting plate and the flexible protective sleeve are integrally formed.

4. The rugby-ball sports speaker of claim 2, wherein a first fixing bracket is further arranged in the receiving slot and the rugby-ball sports speaker further comprises a PCB circuit board fixed on the first fixing bracket, and wherein the receiving casing is further defined with a second wiring hole which communicates the accommodating cavity and the receiving slot.

5. The rugby-ball sports speaker of claim 4, wherein an engaging portion is further arranged in the receiving slot and the speaker assembly comprises a battery and a loudspeaker assembly electrically connected to the battery, and wherein the battery is partially engaged in the engaging portion and the loudspeaker assembly is fixedly connected with the receiving casing thus sealing the battery within the receiving slot.

6. The rugby-ball sports speaker of claim 5, wherein the loudspeaker assembly comprises a second fixing bracket, a loudspeaker, and a fixing cover, and wherein the second fixing bracket is accommodated in the receiving slot and fixedly connected with the receiving casing, the loudspeaker is fixedly connected with the second fixing bracket, and the fixing cover covers the second fixing bracket thus sealing the loudspeaker within the second fixing bracket.

7. The rugby-ball sports speaker of claim 6, further comprising an LED light bar fixed on the second fixing bracket and electrically connected to the PCB circuit board.

8. The rugby-ball sports speaker of claim 7, further comprising a charging assembly which comprises a third fixing bracket, a charging post, and a charging port, wherein the third fixing bracket is fixedly connected with the net cover, the charging post is fixed on the third fixing bracket and electrically connected to the battery, and the charging port is coupled to the charging post.

9. The rugby-ball sports speaker of claim 4, further comprising a button switch and a fourth fixing bracket configured for fixing the button switch, wherein the button switch is electrically connected to the PCB circuit board, and the net cover covers the button switch thus sealing the button switch within the accommodating cavity.

10. The rugby-ball sports speaker of claim 5, further comprising a button switch and a fourth fixing bracket configured for fixing the button switch, wherein the button switch is electrically connected to the PCB circuit board, and the net cover covers the button switch thus sealing the button switch within the accommodating cavity.

11. The rugby-ball sports speaker of claim 6, further comprising a button switch and a fourth fixing bracket configured for fixing the button switch, wherein the button switch is electrically connected to the PCB circuit board, and the net cover covers the button switch thus sealing the button switch within the accommodating cavity.

12. The rugby-ball sports speaker of claim 7, further comprising a button switch and a fourth fixing bracket configured for fixing the button switch, wherein the button switch is electrically connected to the PCB circuit board, and the net cover covers the button switch thus sealing the button switch within the accommodating cavity.

13. The rugby-ball sports speaker of claim 8, further comprising a button switch and a fourth fixing bracket configured for fixing the button switch, wherein the button switch is electrically connected to the PCB circuit board, and the net cover covers the button switch thus sealing the button switch within the accommodating cavity.

14. The rugby-ball sports speaker of claim 1, wherein the flexible protective sleeve is made of a composite material and made by coating polypropylene plastic with polyurethane foam plastic.

15. The rugby-ball sports speaker of claim 6, wherein the loudspeaker is a Bluetooth wireless dual-channel stereo loudspeaker or a single-unit single-channel loudspeaker.

16. The rugby-ball sports speaker of claim 7, wherein the loudspeaker is a Bluetooth wireless dual-channel stereo loudspeaker or a single-unit single-channel loudspeaker.

17. The rugby-ball sports speaker of claim 8, wherein the loudspeaker is a Bluetooth wireless dual-channel stereo loudspeaker or a single-unit single-channel loudspeaker.

* * * * *